April 8, 1941.   F. PRAZEN   2,237,972
EQUALIZING DEVICE
Filed Jan. 24, 1940
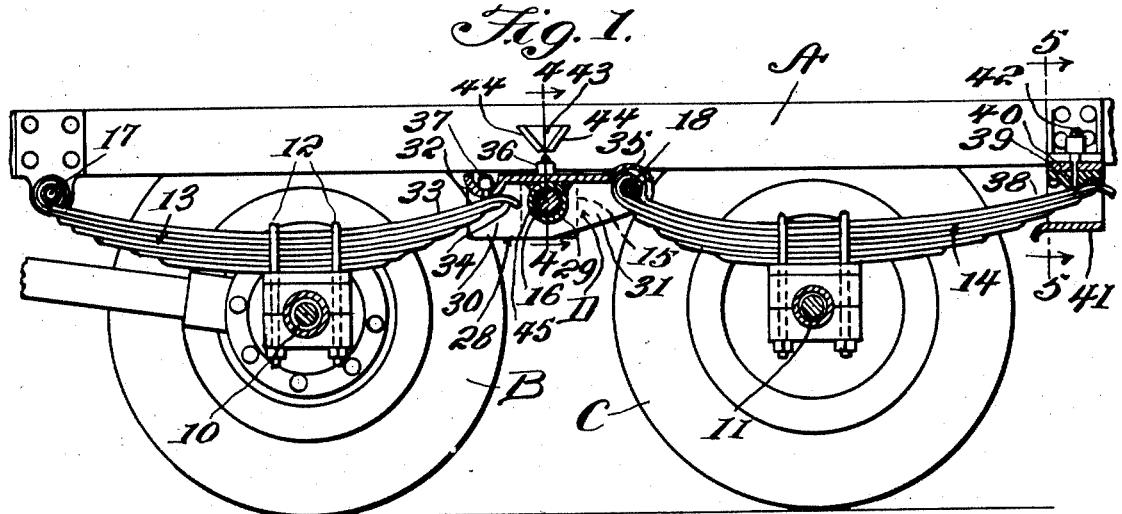
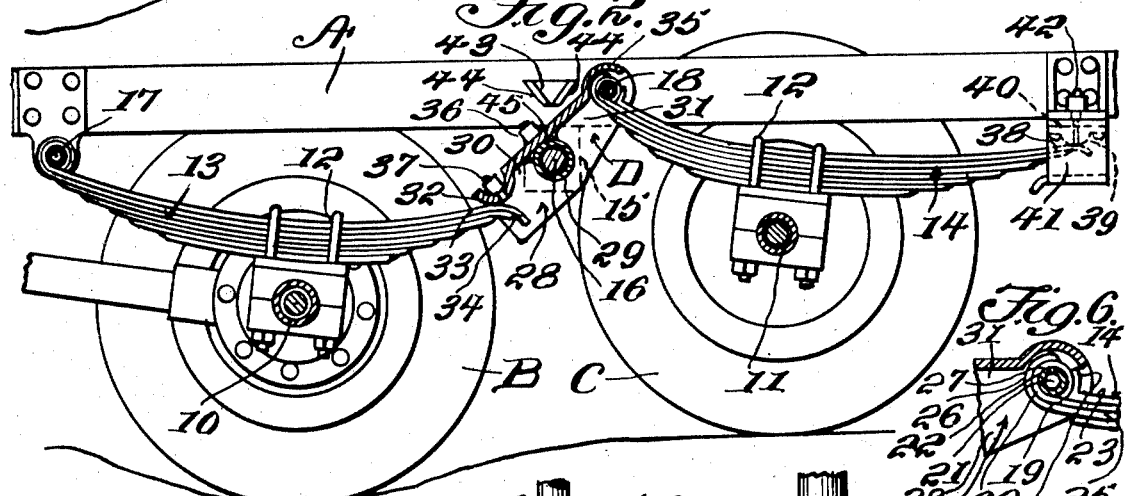
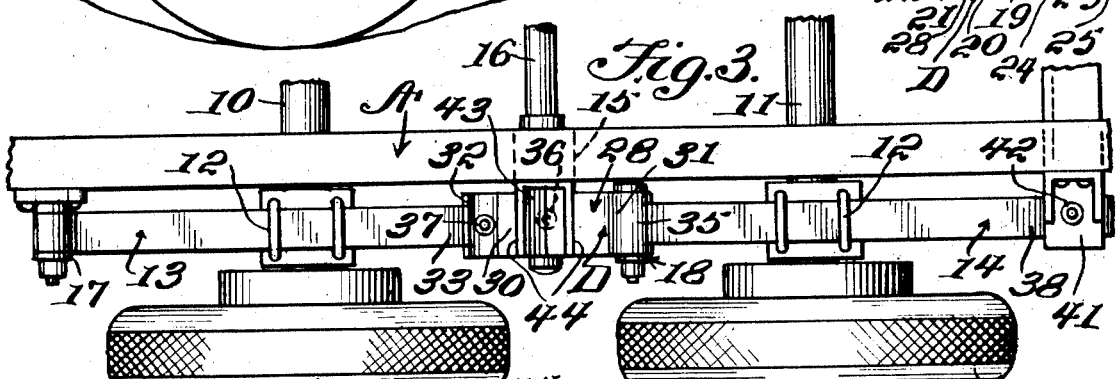
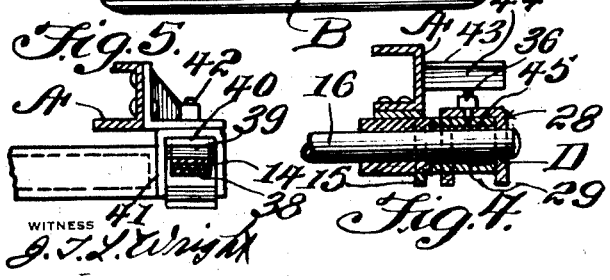
Frank Prazen
INVENTOR
BY Victor J. Evans & Co.
ATTORNEYS Patented Apr. 8, 1941

2,237,972

UNITED STATES PATENT OFFICE 2,237,972

EQUALIZING DEVICE

Frank Prazen, Price, Utah

Application January 24, 1940, Serial No. 315,416

1 Claim. (Cl. 280—104)

The invention relates to an equalizing device and more especially to equalizing connections in a tandem arrangement of multiple axles, traction wheels and springs for the running gear of a wheeled vehicle.

The primary object of the invention is the provision of a device of this character wherein the driving or power wheels of a tandem arrangement of a running gear for a vehicle will be assured of positive traction upon an irregular surface of a roadway and at the same time distributing the load pressure upon the wheels in the tandem arrangement thereof when traveling over the roadway whether irregular or straight and at all times maintaining driving contact of the power or driving wheels with the surface engaged thereby.

Another object of the invention is the provision of a device of this character wherein the springs arranged in tandem with similarly arranged traction wheels in association with said device are suspended from the vehicle chassis frame in a unique and novel manner and the movable surfaces at the points of connection of the said springs with the device as well as the latter and the said springs with the chassis frame will be thoroughly lubricated to minimize wear and to assure the proper functioning thereof when the traction wheels in tandem arrangement are disturbed through traction upon an irregular surface or road bed over which the vehicle travels.

A further object of the invention is the provision of a device of this character wherein on the travel of the vehicle a positive traction of the wheels thereof upon a road surface by the wheels in tandem arrangement by automatic operation of the device will be assured irrespective of irregularity or evenness in the road bed.

A still further object of the invention is the provision of a device of this character wherein a downward thrust upon the power or driving wheel of a tandem running gear arrangement for a vehicle will instantly come about or occur when the driving or power wheel of the tandem lowers relative to the tread plane of the other wheel of the tandem thereof and in this manner avoiding the possibility of any loss of driving power for the vehicle in that slippage of the power or driving wheels tracking a road bed is avoided or relieved to a minimum.

A still further object of the invention is the provision of a device of this character, which in its construction and association is simple, thoroughly reliable and efficient in operation, being possessed of maximum strength, wear and durability, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:

Figure 1 is a fragmentary side elevation partly in section of the tandem wheels, axle and spring arrangement of a vehicle showing the equalizer constructed in accordance with the invention applied and the wheels of the tandem traveling upon a smooth straight road bed.

Figure 2 is a view similar to Figure 1 showing one of the wheels of the tandem lowered from the plane of trackage of the other wheel of said tandem with the equalizer in an automatically adjusted position.

Figure 3 is a plan view of the assembly shown in Figure 1.

Figure 4 is a detail sectional view taken on the line 4—4 of Figure 1 looking in the direction of the arrows.

Figure 5 is a detail sectional view taken on the line 5—5 of Figure 1 looking in the direction of the arrows.

Figure 6 is a fragmentary longitudinal sectional view through the equalizer at its connection with one of the springs of the tandem assembly thereof.

Similar reference characters indicate corresponding parts throughout the several views in the drawing.

Referring to the drawing in detail, A designates generally a portion of one of the side sills or beams of a chassis frame for a wheeled vehicle; B the power or driving wheel and C the other wheel of a tandem arrangement of these at one side of the vehicle. It is understood that such tandem arrangement of wheels exists at the other side of the vehicle, it being required for an understanding of the invention that a tandem arrangement of a pair of such wheels at one side of the vehicle be illustrated and thus hereinafter described for association with the equalizer device denoted generally at D in the said drawing.

The axles 10 and 11 for the wheels B and C, respectively, are fastened clipped at 12 hung or suspended from springs 13 and 14, respectively, each of the multiple leaf bowed type. The clips 12 connecting the axle 10 to the spring 13 dispose this axle 10 slightly rearwardly of the transverse median between the ends of the spring 13 while the clips 12 connecting the axle 11 with the spring 14 dispose the axle forwardly of the transverse median between the ends of the said spring 14. Such disposition of these axles 10 and 11 with respect to the foregoing is disclosed by Figures 1, 2 and 3 of the drawing.

Located between the ends of the springs 13 and 14 and suitably mounted as at 15 with respect to the sill or beam A of the chassis frame is a horizontally arranged shaft 16 having hung thereon the equalizer device D for rocking movement and hereinafter described in detail.

The spring 13 has the forward end thereof pivotally connected at 17 to the sill or beam A while the spring 14 has its forward end pivoted at 18 to the equalizer device D. The connecting of the spring 14 is brought about by having a leaf or spring ply 19 thereof turned at 20 about a pin 22 of the pivot 18, said pin being provided with an axially disposed bore having secured in one end thereof the inner end of a lubricant fitting whereby lubricant may be supplied to the outer face of the pin and inner face of the turn 20 as hereinafter set forth. The uppermost leaf or ply 23 of this spring 14 has an upturned terminal abutment 24 contacting with the turn 20 of the leaf or ply 19. Another leaf or ply 25 of this spring 14 has an end 26 of the said leaf or ply 25 partially carried about the turn 20 of the leaf or ply 19, as is shown in detail in Figure 6 of the drawing. The pin 22 is apertured at 27 for the aforementioned lubrication of the outer face of said pin 22 and said turn 20 of the pivot 18.

The equalizer device D comprises a rocker 28 formed with a bearing 29 for swingable connection with the shaft 16. At opposite sides of this bearing 29 are long and short portions 30 and 31, respectively, to the said rocker 28 for effecting variable leverage action to the said rocker 28. The short portion 30 is adjacent to the spring 13 while the long portion 31 is next to the spring 14. This portion 30 has struck downwardly therefrom a channeled fulcrum rib or contact 32 engageable with the uppermost leaf or ply 33 at the rearward and downwardly curved end 34 thereof of the spring 13. This end 34 is sustained engaged with the fulcrum rib 32. The long portion 31 of the rocker 28 has the pivot 18 between the rocker 28 and the spring 14 enclosed thereby and also provides an overhang 35 to the said pivot 18. Lubricating cups 36 and 37, respectively, are carried by the rocker 28. The cup 36 is for lubricating the bearing 29 and the cup 37 is adapted to lubricate the fulcrum rib 32 and the end 34 of the spring 13 coacting with this rib.

The spring 14 at the end 38 has contact with a removable wear piece 39 of a fulcrum 40 built in a hanger 41 which is provided with a lubricant cup 42 for the lubrication of the fulcrum 40 and the end 38 of the spring 14.

Fixed to and projecting outwardly from the sill or beam A of the chassis frame into the path of the long and short portions 30 and 31 of the rocker 28 is a stop 43 which limits the rocking motion through contact of the portions 30 and 31 therewith of the rocker 28 when the wheels B and C are disturbed through traction on the travel thereof over an irregular road bed. The stop 43 is in the form of a horn having the downwardly convergent or reversely beveled sides 44 in the path of movement of the rocker 28 for contact of the portions 30 and 31 alternately according to the swing of the said equalizer device. The equalizer device is automatically brought into operation on the travel of the wheels B and C in tandem arrangement over a ground surface so that when traction is had with irregularities therein or the wheel B engages a depression in such surface below the plane of contact or traction of the wheel C the said equalizer device effects a positive engagement of the wheel B with the surface contacted thereby to avoid any slippage and resultant loss of driving energy thereof. At the same time the equalizer device enables uniform distribution of the load of the vehicle between the tandem-arranged wheels B and C.

It may be found desirable to fasten the wheel C elevated from a ground surface so that the driving wheel B will operate singly in the tandem arrangement for traction on a road bed and to effect this the rear spring 14 can be lifted and fastened in any suitable manner in its lifted position relieving the wheel C from traction upon the ground surface. In such event or instance the equalizer device D will be forwardly tilted in contact with the stopper 43. This disposition of the equalizer device D relieves it of equalizing activity in the tandem arrangement hereinbefore set forth.

The hanger 41 is made fast to the sill or beam A of the chassis frame and the fixture thereof is clearly shown in Figures 1, 2 and 3 of the drawing and also the pivot 17 is fixed similarly to the sill or beam A of the said chassis frame of the vehicle.

The equalizer devices D involving the rocker 28 is built with a bushing 45 related to the bearing 29 and the detailed construction and arrangement of the same is disclosed in Figure 4 of the drawing.

The driving wheel B is power driven in the usual conventional way.

The purpose of the long and short ends of the equalizer in its mounting is to distribute sixty percent of the load to the spring 13 and forty percent of the said load to the spring 12 and thus obtain more traction on the driving axle and to assure proper braking safety.

What is claimed is:

The combination with a frame of an automobile, tandem arranged springs in longitudinal alinement and having their adjacent ends spaced apart, a drive axle secured to the forward spring in rear of a central point thereof, a pivotal connection between the forward end of the spring and the frame, a rocker member pivoted to the frame intermediate the ends of the springs and having a short arm slidably engaging the rear end of the forward spring, a pivotal connection between the long arm of the rocker member and the forward end of the rear spring, a sliding connection between the rear end of the rear spring and the frame, an axle secured to the rear spring forward of a central point thereof, and wheels carried by said axles.

FRANK PRAZEN.